Aug. 19, 1924.
C. GIRL
BUMPER
Filed Nov. 23, 1922
1,505,556
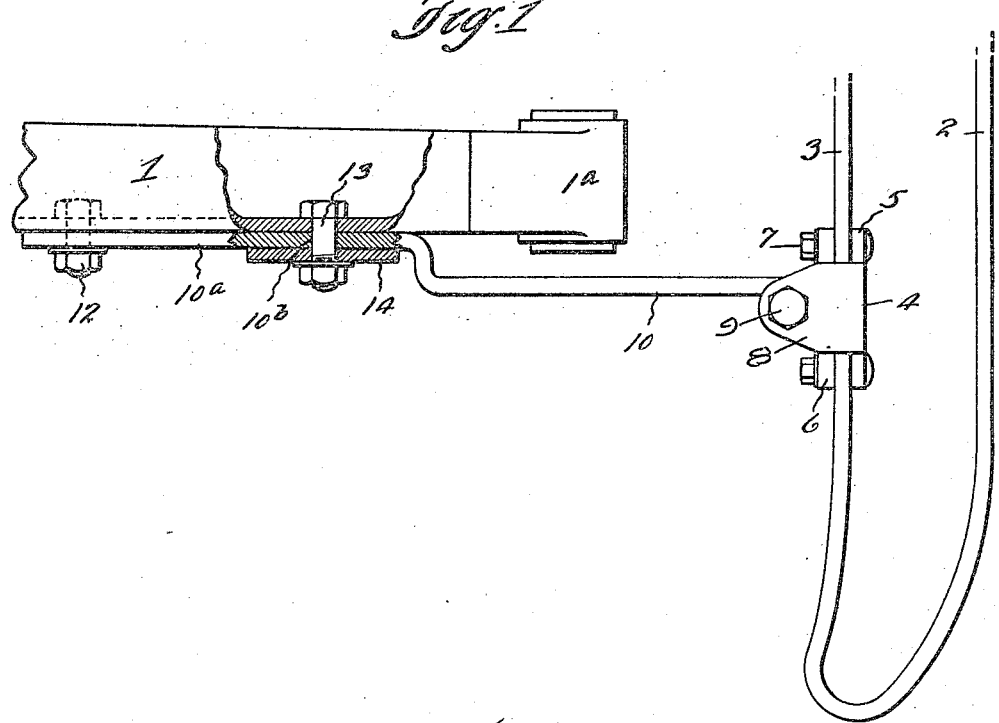
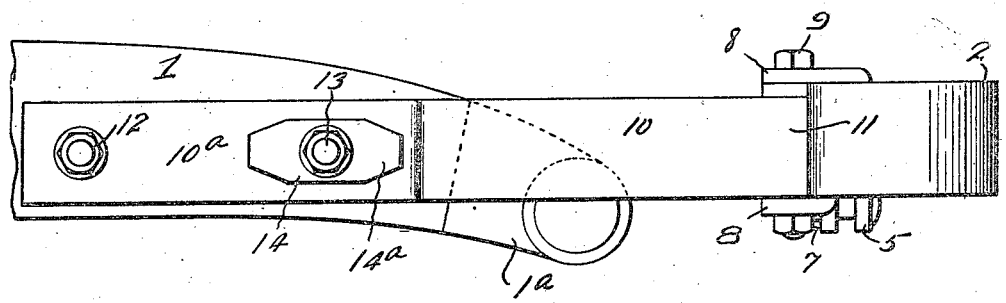
Inventor
Christian Girl,
By Hull, Brock & West
Attys.

Patented Aug. 19, 1924.

1,505,556

UNITED STATES PATENT OFFICE.

CHRISTIAN GIRL, OF KALAMAZOO, MICHIGAN, ASSIGNOR TO THE C. G. SPRING & BUMPER COMPANY, OF DETROIT, MICHIGAN, A CORPORATION OF DELAWARE.

BUMPER.

Application filed November 23, 1922. Serial No. 602,681.

*To all whom it may concern:*

Be it known that I, CHRISTIAN GIRL, a citizen of the United States, residing at Kalamazoo, in the county of Kalamazoo and State of Michigan, have invented a certain new and useful Improvement in Bumpers, of which the following is a full, clear, and exact description, reference being had to the accompanying drawings.

This invention relates to automobile bumpers, and more particularly to the means for supporting the same from the side frame members of such vehicles. It is the general object of the invention to provide a means for attaching the supporting arms or members of such bumpers to the side frames in a manner which will prevent the arms from breakage at or in the immediate vicinity of the bolt hole or bolt holes by which the arms are so secured to the frame members.

In the drawings forming part hereof, Fig. 1 represents a sectional plan view of a portion of an automobile bumper and its cooperating side frame members, showing the manner in which my invention is employed therewith; and Fig. 2 is a side elevation of the parts shown in Fig. 1.

Describing the various parts by reference characters, 1 denotes one of the channeled side frame members of an automobile, 2 the front bar or plate, and 3 the rear bar or plate of a bumper. The bumper may be of any desired construction, the form shown herein being selected merely for purposes of illustration. Adjustably mounted upon the rear bar or plate 3 is a clamp 4 which, as shown, comprises generally a front or outer member 5 and a rear or inner member 6, receiving therebetween the rear bar or plate 3 and being secured together by bolts 7. The clamp is provided with rearwardly or inwardly extending projections 8 by means of which it may be pivotally secured, as by means of a bolt 9, to an eye 11 on the front or outer end of a supporting arm 10. Two such supporting arms will be employed, one for each of the side members 1.

The supporting arms 10 are preferably of flat-plate stock, each preferably offset outwardly to provide proper clearance with the spring horn at the end of the side member and with the spring supporting bolt (not shown). The rear or inner portion 10ª of the supporting arm is adapted to bear against the web of the channeled side frame member and is secured near its extreme rear or inner end to such web by means of a bolt 12. A similar bolt 13 is employed for securing the front end of the portion 10ª to the side member.

When the bumper receives a blow or shock which results in a tendency to move it laterally as well as rearwardly or inwardly, a lateral thrust is exerted upon the supporting arms, and there is a tendency for such arms to break at the front or outer bolt holes 10ᵇ. In order to prevent such breakage, I apply to the outer face of each of these supporting arms a reinforcing plate 14, preferably of less width than the width of such arm and each having a central hole for the reception of the bolt 13. Each of the plates 14 is preferably chamfered or tapered at its ends, as shown at 14ª, whereby it is adapted to yield with the arm 10ª, when the latter is subjected to a lateral thrust.

It has been found in practice that, by the use of this reinforcement plate at the point indicated, the spring steel bumper arms 10 are prevented from breaking at the bolt holes, with the result that the lives of these arms are greatly prolonged and the safety of the vehicle and its occupants is correspondingly enhanced.

Having thus described my invention, what I claim is:

1. The combination, with the side member of a vehicle, of a bumper, a supporting arm for said bumper, the said arm having a flat portion adapted to bear against the side member, a bolt extending through apertures in the side member and the arm for securing the latter to the former, and a reinforcing plate mounted on the outer surface of said arm and also having an aperture for said bolt, the said plate forming a bearing for one end of such bolt and extending a short distance from such bolt toward the bumper, whereby the arm and plate will yield under thrusts applied laterally to said arm between said bolt and said bumper.

2. The combination, with a bumper, of a supporting arm for said bumper having a portion adapted to bear against and be attached to a vehicle, and means for securing the said arm to such vehicle, said means comprising a reinforcing plate adapted to be applied to the outer surface of such arm, said plate having an opening therethrough and having a portion extending a short distance from such bolt toward the bumper and having the end of such portion beveled or tapered, whereby the arm and plate will yield under thrusts applied laterally to said arm between said bolt and said bumper.

In testimony whereof, I hereunto affix my signature.

CHRISTIAN GIRL.